US007936889B2

(12) United States Patent
Aiso et al.

(10) Patent No.: US 7,936,889 B2
(45) Date of Patent: May 3, 2011

(54) MIXER APPARATUS AND PARAMETER-SETTING CHANGING METHOD FOR USE IN THE MIXER APPARATUS

(75) Inventors: Masaru Aiso, Hamamatsu (JP); Takamitsu Aoki, Hamamatsu (JP)

(73) Assignee: Yamaha Corportion, Hamamatsu-shi (JP)

( * ) Notice: Subject to any disclaimer, the term of this patent is extended or adjusted under 35 U.S.C. 154(b) by 1345 days.

(21) Appl. No.: 11/446,081

(22) Filed: Jun. 1, 2006

(65) Prior Publication Data

US 2006/0282562 A1 Dec. 14, 2006

(30) Foreign Application Priority Data

Jun. 9, 2005 (JP) ................................ 2005-169419

(51) Int. Cl.
*H04B 1/00* (2006.01)

(52) U.S. Cl. .............................. 381/119; 369/4; 700/94

(58) Field of Classification Search .................. 381/119, 381/109; 700/94; 369/3–4
See application file for complete search history.

(56) References Cited

U.S. PATENT DOCUMENTS 7,139,625 B2 * 11/2006 Aiso et al. ....................... 700/94
2005/0192688 A1 * 9/2005 Takemura ....................... 700/94

FOREIGN PATENT DOCUMENTS

JP 63-273162 A 11/1988
JP 03-157755 A 7/1991
JP 08-180117 A 7/1996

OTHER PUBLICATIONS

Notice of Grounds for Rejection mailed Jun. 1, 2010, for JP Patent Application No. 2005-169419, with English Translation, four pages.
PM5D Digital Mixing Console, PM5D/PM5D-RH Owner's Manual, 2004, Yamaha Corporation, Japan.
European Search Report mailed Nov. 29, 2010, for EP Patent Application No. 06011497.2, five pages.

* cited by examiner

*Primary Examiner* — Devona E Faulk
*Assistant Examiner* — Disler Paul
(74) *Attorney, Agent, or Firm* — Morrison & Foerster LLP

(57) ABSTRACT

Signal processing parameter is settable separately for each of a plurality of channels (ch1-ch6). User designates a transfer source channel (e.g., ch1) and transfer destination channel (e.g., ch4) from among the plurality of channels, to thereby give a parameter transfer instruction. In response to the transfer instruction, the parameter setting of the transfer destination channel (ch4) and parameter settings of all channels (ch2-ch3) located intermediate between the transfer destination channel and the transfer source channel are sequentially shifted toward the transfer source channel (ch1), and the parameter setting of the transfer source channel (ch1) is transferred to the transfer destination channel (ch4). In this way, the parameter setting of the transfer source channel (ch1) is inserted into the transfer destination channel (ch4); the parameter settings of the other channels are sequentially shifted to respective adjoining channels in accordance with the parameter setting insertion.

9 Claims, 3 Drawing Sheets

MIXER APPARATUS AND PARAMETER-SETTING CHANGING METHOD FOR USE IN THE MIXER APPARATUS

BACKGROUND OF THE INVENTION

The present invention relates to a mixer apparatus, and method and program for changing parameter settings of input channels or output channels in the mixer apparatus.

Digital mixers have been known which convert an analog audio signal, input for each of a plurality of input channels, into a digital signal and then perform mixing processing on the converted digital signals. In these digital mixers, each of signals input via a plurality of input terminals is allocated to any desired input channel of a predetermined plurality of input-system (or input-side) channels, characteristics and level of the digital signal input to the input channel is adjusted on the basis of various parameters set for that channel, and the thus-adjusted signal is delivered to a desired mixing bus. The mixing bus mixes the signals supplied from the individual input channels and outputs the mixed signals to output-system (or output-side) channels corresponding to the mixing bus. Each of the output-system channels adjusts characteristics and level of the supplied digital signal and outputs the thus-adjusted signal to outside the mixer. Various signal processing, such as the characteristic adjustment and level adjustment (sound volume control), equalizing and mixing processing, of the digital audio signal is carried out by a digital signal processing device (DSP). User of each of these conventional digital audio mixers can manually perform various operation related to the various signal processing, parameter setting operation, etc. using various physical operators, graphical user interface (GUI) of a display device, such as an LCD, provided on an operation panel (or mixing console). Values corresponding to the various operation performed by the user are set in the DSP as parameters for signal processing to be performed. Among examples of such digital audio mixers is a digital mixer commercially available from the assignee of the instant application under a product name "PM5D" (see, for example, a website "http//www2.yamaha.co.jp/manual/pdf/pa/japan/mixers/PM5DJ1.pdf" (hereinafter referred to as "non-patent literature").

In the digital mixer disclosed in the above-identified non-patent literature, information indicative of settings of various parameters of a given channel can be copied and then pasted into another channel of the same channel type. More specifically, the user can copy, into a buffer memory, information indicative of settings of various parameters of a currently-selected channel (i.e., copied-from channel or copy source channel) and designate, as a pasted-to channel (or paste destination channel), a desired channel of the same channel type as the copy source channel, so that the parameter settings copied into the buffer memory can be pasted into the designated channel. Further, in the disclosed digital mixer, the user can select any desired kind of parameter for copying and pasting. In the paste destination channel, the previous setting of the parameter is overwritten with the pasted setting of the parameter.

However, when information of a given channel is to be transferred and inserted into a location of another channel in the digital mixer disclosed in the above-identified non-patent literature, the user has to perform operation for writing the parameter setting(s) of the copy source channel (or inserted-from channel) into the insertion destination channel (or inserted-to channel) after performing operation for sequentially shifting, by one channel, the parameter settings of all of the other channels than the copy source channel (i.e., channels located intermediate between the copy source channel and the insertion destination channel as well as the insertion destination channel, to respective adjoining channels through repetition of copy-and-paste operation.

SUMMARY OF THE INVENTION

In view of the foregoing, it is an object of the present invention to provide an improved mixer apparatus and mixer-parameter-setting changing method which can facilitate operation for transferring and inserting a parameter setting of a given channel into a location of another channel.

In order to accomplish the above-mentioned object, the present invention provides an improved mixer apparatus, which comprises: a plurality of signal processing channels; a setting section that sets a signal processing parameter for each of the channels; a channel designation section that designates a parameter transfer source channel and a parameter transfer destination channel; and a control section that, in accordance with designation by the channel designation section, performs control to transfer a setting of a parameter of at least one of the channels in the setting section to another one of the channels, the control section performing control to transfer a parameter setting of the designated transfer source channel to the designated transfer destination channel and sequentially shift, toward the transfer source channel, parameter settings of all channels located intermediate between the designated transfer source channel and the designated transfer destination channel and parameter setting of the transfer destination channel.

Once the user designates a parameter transfer source channel (i.e., channel which a parameter setting is to be transferred from) and parameter transfer destination channel (i.e., channel which the parameter setting is to be transferred to) via the channel designation section, the control section in the present invention automatically performs an operation for transferring and inserting the parameter setting of the transfer source channel into the transfer designation channel. Namely, the control section automatically performs an operation for not only transferring the parameter setting of the designated transfer source channel to the designated transfer designation channel but also sequentially shifting, toward the transfer source channel, the parameter settings of all of the channels located intermediate between the transfer source channel and the transfer destination channel and parameter setting of the transfer destination channel. When only one channel is designated as the parameter transfer source channel, the parameter settings of all of the channels located intermediate between the transfer source channel and the transfer destination channel and parameter setting of the transfer destination channel are sequentially shifted by one channel toward the transfer source channel. If the designated transfer source channel is set in a paired-channel relationship with another channel (i.e., the number of the transfer source channel is two), the parameter settings of all of the intermediate channels and parameter settings of a predetermined pair of transfer destination channels are sequentially shifted by two channel toward the paired transfer source channels. Such shifting can create an empty space for insertion of the parameter setting(s) of the transfer source channel(s). Thus, with the present invention, it is possible to automatically perform the cumbersome parameter transfer/insertion operation that heretofore had to be done manually in the past, so that the operation for transferring and inserting a parameter setting of a given channel to a location of another channel can be performed with an increased ease.

In an embodiment of the present invention, the mixer apparatus further comprises: a determination section that determines whether the transfer source channel designated by the designation section is currently set in a paired-channel relationship with any other channel; and a pair channel addition section that, when the determination section has determined that the transfer source channel designated by the designation section is currently set in the paired-channel relationship with any other channel, adds, as another transfer source channel, the other channel to be paired with the designated transfer source channel and also adds, as another transfer destination channel, any other channel to be paired with the designated transfer destination channel. In accordance with the designation by the channel designation section and addition by the pair channel addition section, the control section performs control to transfer the parameter settings of the paired transfer source channels to the paired transfer destination channels and sequentially shift, toward the transfer source channels, the parameter settings of all channels located intermediate between the paired transfer source channels and the paired transfer destination channels and parameter settings of the paired transfer destination channels. Namely, when the transfer source channel designated by the designation section is currently set in the paired-channel relationship with any other channel, the other channel to be paired with the designated transfer source channel is added as another transfer source, and thus, the present invention can achieve the superior benefit that a parameter setting of a given channel can be inserted into a location of another channel with the paired state maintained (i.e., without the paired state being lost).

The present invention may be constructed and implemented not only as the apparatus invention as discussed above but also as a method invention. Also, the present invention may be arranged and implemented as a software program for execution by a processor such as a computer or DSP, as well as a storage medium storing such a software program. Further, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

For better understanding of the objects and other features of the present invention, its preferred embodiments will be described hereinbelow in greater detail with reference to the accompanying drawings, in which.

DETAILED DESCRIPTION OF THE INVENTION

Figure 1:
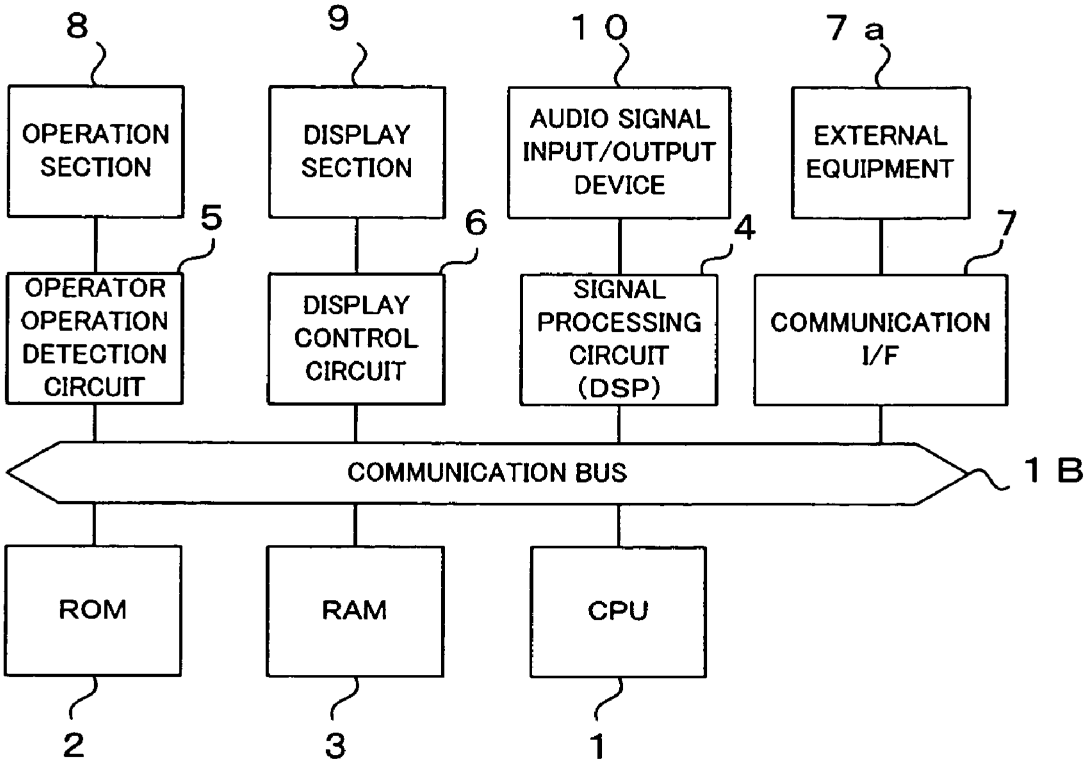
FIG. 1 is a block diagram showing a general electric hardware setup of a digital mixer in accordance with an embodiment of the present invention.

FIG. 1 is a block diagram showing a general electric hardware setup of an audio mixer in accordance with an embodiment of the present invention. The audio mixer of FIG. 1 includes a CPU 1, a ROM 2, a RAM 3, a signal processing circuit (DSP) 4, an operator operation detection circuit 5, a display control circuit 6 and a communication interface (I/F) 7, and these various components are interconnected via a communication bus 1B.

The CPU 1 executes various control programs stored in the ROM 2 or RAM 3 to control general behavior of the mixer. In the RAM 3, there are provided a current memory area for storing various parameters etc. currently set in the mixer, and a buffer area for buffering various data generated during a channel parameter transfer process. The ROM 2 may be implemented by a rewritable non-volatile memory (flash memory), and the current memory area may be provided in the flash memory. All of the various programs to be executed by the CPU 1 need not be prestored in the ROM 2 or RAM 3; some of the programs to be executed by the CPU 1 may be downloaded from one or more server computers via a not-shown communication interface, or prestored in an external storage medium, such as a not-shown HDD and CD-ROM. In such a case, the programs are transferred to the RAM 3 and executed under the control of the CPU 1. Thus, addition of a program, version upgrade of a designated program, etc. can be carried out with ease.

Operation section (operation panel) 8, including physical operators operable by the user to perform various operation, is connected to the CPU 1 via the operator operation detection circuit 5 and communication bus 1B. Using the operators of the operation section 8, the user can perform various operation related to mixing processing, make parameter settings and give instructions for starting or activating various functions. Operational contents of the operation section 8 and setting states of the individual operators on the operation section 8 are detected via the operator operation detection circuit 5 and then supplied to the CPU 1. Further, a display section 9 is connected to the CPU 1 via the display control circuit 6 and communication bus 1B. The display section 9 is, for example, in the form of an LCD and provided on the operation panel 8. The user can read out any of windows corresponding to various functions of the mixer and make general settings of the mixer, settings of parameters of the individual functions using a GUI on the window read out to the display section 9.

The mixer of FIG. 1 is connected via the communication I/F 7 to external equipment 7*a*, such as a personal computer, so that data communication can be performed between the mixer and the external equipment 7*a*. By the external equipment 7*a* executing software programs for controlling the mixer, the general behavior of the mixer can be controlled via the external equipment 7*a*, and operational conditions etc. of the mixer can be displayed on a display of the external equipment 7*a*.

The CPU 1 gives the signal processing circuit (DSP) 4 instructions based on various operation performed by the user via the operation section 8 and display section 9. The DSP 4 performs signal processing, based on instructions given by the CPU 1, on digital audio signals input via an audio signal input/output device 10, and it then supplies the digital audio signals, obtained as a result of the signal processing, to the audio signal input/output device 10. The audio signal input/output device 10 is an interface which includes a D/A converter, amplifier, etc. and which inputs analog audio signals or digital audio signals to the mixer and outputs analog audio signals or digital audio signals having been subjected to the signal processing by the mixer.

Fundamental mixer operation performed by the DSP 4 is briefed here. The audio signal input/output device 10 is equipped with a plurality of input terminals and a plurality of output terminals. A plurality of kinds of input signals (digital audio signals) are supplied to the DSP 4 via the plurality of input terminals of the audio signal input/output device 10. The signals input via the plurality of input terminals are allocated to desired input channels of input-system (or input-side) channels. Throughout this specification, allocation of input signals of the input terminals to the input-system channels and allocation of output signals of the output-system channels to the output terminals will be called "patch", and data indicative of patch settings will be referred to as "patch data". Namely, the signals input via the individual input terminals are allocated to the input channels in accordance with the settings of the patch data. Each of the input-system channels performs signal processing on the input digital signal, on the basis of various parameters set for that channel, to adjust characteristics and level of the input digital signal, and then outputs the resultant processed signal to a desired mixing bus. The mixing bus performs mixing processing on a plurality of signals supplied from the individual input channels and outputs the mixing-processed (or mixed) signals to output-system channels corresponding thereto. Each of the output-system channels performs signal processing on the supplied digital signal, on the basis of various parameters set for that channel, to adjust characteristics and level of the digital signal, and then outputs the resultant processed signal to outside the mixer in accordance with the patch data.

Figure 2:
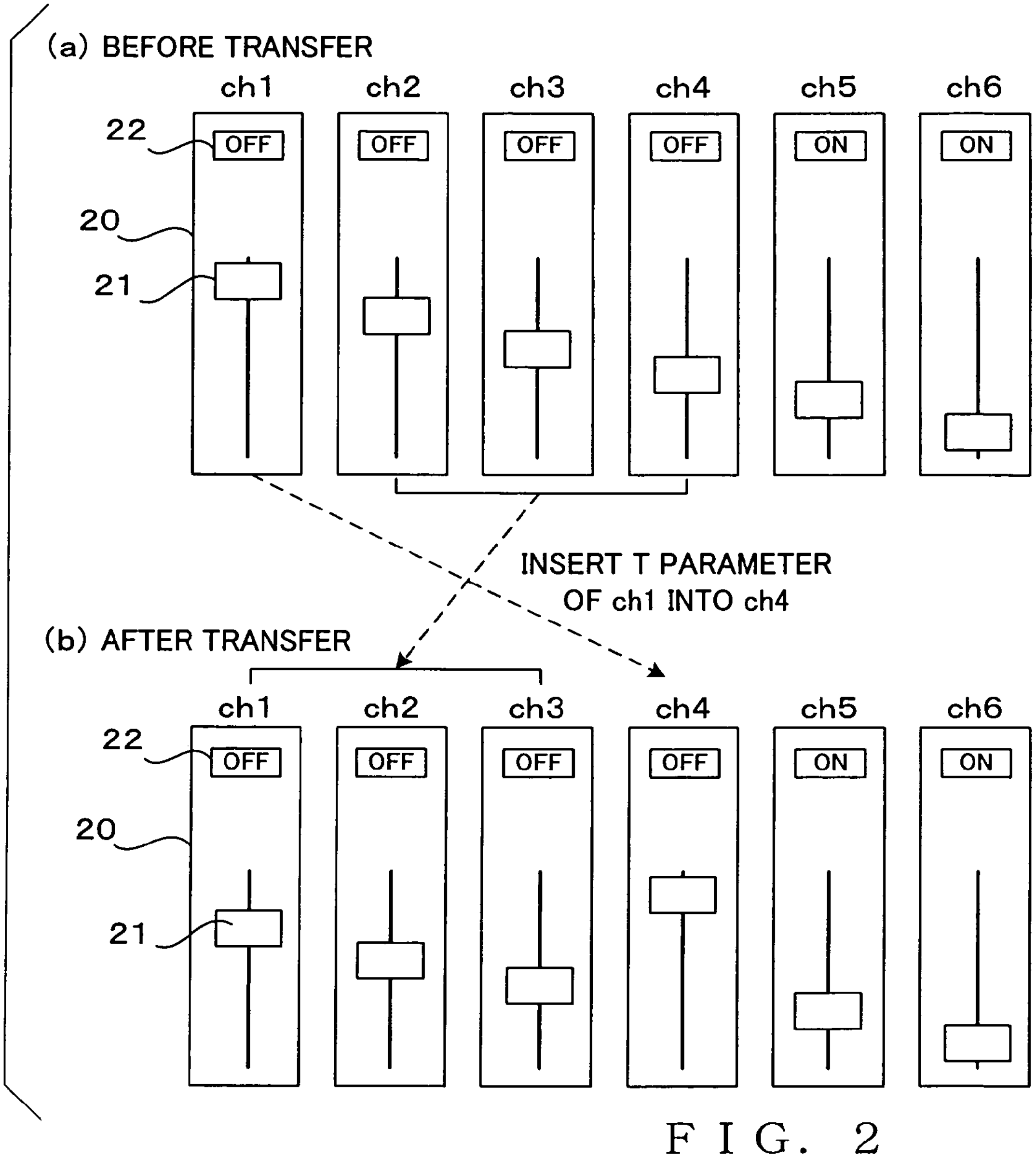
FIG. 2 is a diagram outlining a channel parameter transfer function performed in the embodiment.

FIG. 2 is a diagram outlining the basic principles of the present invention, which schematically shows channel strip sections provided on the operation panel (operation section) 8 for a plurality of channels (six channels in the illustrated example); more specifically, (a) and (b) of FIG. 2 show the channel strip sections before and after transfer of a parameter(s), respectively. In (a) and (b) of FIG. 2, reference numeral 20 represents a plurality of channel strip sections, and "ch1"-"ch6" indicated immediately above the channel strip sections 20 represent channel numbers which are successive unique numbers allotted to individual channels. The channel strip sections 20 are disposed on the operation panel in the order of the channel numbers "ch1"-"ch6". Each of the channel strip sections 20 includes a plurality of physical operators for setting various parameters, such as a fader operator 21 operable to adjust a sound volume level of the input signal. Using these operators, the user can set various signal processing parameters for each of the channels allocated to the channel strips. In FIG. 2, only the fader operators 21 are indicated as the parameter setting operators with illustration of the other physical operators omitted, for convenience of explanation and illustration. Among examples of parameters set for each of the channels are a fader level parameter and parameters for an equalizer (EQ) function, compressor (COMP) function, etc. In this specification, such parameters set for each of the channels will be referred to as "channel parameters". Information indicative of the settings of the channel parameters (i.e., parameter setting information) for the individual channels are stored in the current memory area in the RAM 3 and managed in the current memory area per channel number. The DSP 4 performs signal processing on the signal of each of the channels on the basis of the information indicative of the settings of the channel parameters for that channel (see FIG. 1).

Further, the user can combine desired two channels into a channel pair (i.e., paired channels) so that one or more parameters can be interlocked between the paired channels. For example, by pairing monaural input channels, it is possible to supply a signal of each channel of two-channel, stereo audio signals separately to each of the paired channels, so that a stereo operation can be performed in the paired channels. In the instant embodiment, channels of predetermined two successive channel numbers (i.e., successive, odd and even channel numbers) can be paired (in the illustrated example of FIG. 2, channels ch1 and ch2, and channels ch3 and ch4, and channels ch5 and ch6). Using a "channel pairing ON/OFF" switch 22 of any desired one of the channel strips 20, the user can instruct ON or OFF of channel pairing setting between the channel and the next channel (i.e., channel of the next channel number). Once the user depresses the channel pairing ON/OFF switch 22 of a given channel (e.g., channel ch5) and then depresses the channel pairing ON/OFF switch 22 of another channel (e.g., channel ch6) to be paired with the given channel while still depressing the switch 22 of the given channel, at least one of parameters of the channel corresponding to the earlier-depressed channel pairing ON/OFF switch 22 (channel ch5) is copied to the other channel (channel ch6), so that these two channels are paired (i.e., combined into a channel pair). In the illustrated example of FIG. 2, the channel pairing ON/OFF switches 22 of channels ch5 and ch6 are each in the ON state, which means that channels ch5 and ch6 are currently set in a paired-channel relationship with each other. The channel pairing can be canceled by the user merely depressing the channel pairing ON/OFF switch 22 of one of the paired channels and depressing the channel pairing ON/OFF switch 22 of the other of the paired channels while still depressing the switch 22 of the one channel. After two channels are paired in the above-described manner, the copied one or more parameters can be simultaneously adjusted in the paired channels. Among examples of parameters that can be simultaneously adjusted in the paired channels are a fader level and parameters for the compressor (COMP) function, equalizer (EQ) function, etc. Even if two channels have been paired, panning (PAN) parameter etc. are not copied from one of the paired channels to the other and can not be simultaneously adjusted in the paired channels. Details of such channel pairing are also disclosed in the above-discussed non-patent literature.

The mixer according to the instant embodiment of the invention is equipped with a function for inserting channel parameter setting information of a given channel into another channel (hereinafter "channel parameter transfer function"). If the "channel parameter transfer function" is performed, in the illustrated example of (a) of FIG. 2, with channel ch1 and channel ch4 designated as a transfer source channel (i.e., transferred-from channel) and transfer destination channel (i.e., transferred-to channel), respectively, of some parameter, control is performed to insert the parameter setting of channel ch1 into channel ch4 and to sequentially shift the parameter settings of channels ch2 and ch3 located intermediate between the transfer source channel ch1 and the transfer destination channel ch4 and the parameter setting of the transfer destination channel ch4 to respective adjoining channels ch1-ch3 (i.e., channels of channel numbers smaller by one than channels ch2, ch3 and ch4). Kind of each parameter to be transferred from the transfer source channel to the transfer destination channel may be selected as desired by the user.

Among examples of parameters selectable as channel parameters to be transferred (i.e., objects of transfer) are settings of the EQ function and COMP functions, delay setting, fader level, setting of a channel ON/OFF switching function, balance setting, settings of an insert ON/OFF switching function and insert point, send level to a desired MATRIX bus, setting of a DCA group to which the channel belongs to, settings of a MUTE group to which the channel belongs to, setting of an LCR screen (three channel reproduction mode), selection information as to whether a send level to a MIX bus is to be transferred, etc. The user can select all, some or just one of these parameters as "an object of transfer".

What is transferred between the channels by the channel parameter transfer function is only the channel parameter setting, and the channel numbers are left unchanged; therefore, the patch data of the input channels or output channels are not influenced at all, and thus, for example, the allocation of the input terminals to the input channels itself is not changed. For such reasons, the "channel parameter transfer function" in the instant embodiment is useful in performing an operation for, when a change has occurred, for example, in relationship between an input terminal and a given input source, transferring a channel parameter of the input channel in accordance with the change.

If the channel selected as the transfer source is currently set in a paired-channel relationship with another channel, not only the two channels are designated as transfer source channels (i.e., paired transfer source channels), but also two channels are set and handled as paired transfer destination channels. In this way, the channel parameter setting in question can be transferred with the paired state maintained (i.e., without the paired state being lost). In the illustrated example of FIG. 2, if the transfer source channel ch1 is in a paired-channel relationship with channel ch2 and once channel ch4 is designated as a transfer destination, channel ch4 is paired with channel ch3, and these paired channels ch4 and ch3 are set as transfer destination channels. Then, by execution of the "channel parameter transfer function", not only parameter settings of channels ch1 and ch2 are inserted into channels ch3 and ch4, but also channel parameter settings of the transfer destination channels ch3 and ch4 are sequentially shifted to adjoining channels ch1 and ch2.

The following paragraphs describe details of operation for realizing the aforementioned "channel parameter transfer function".

Figure 3:
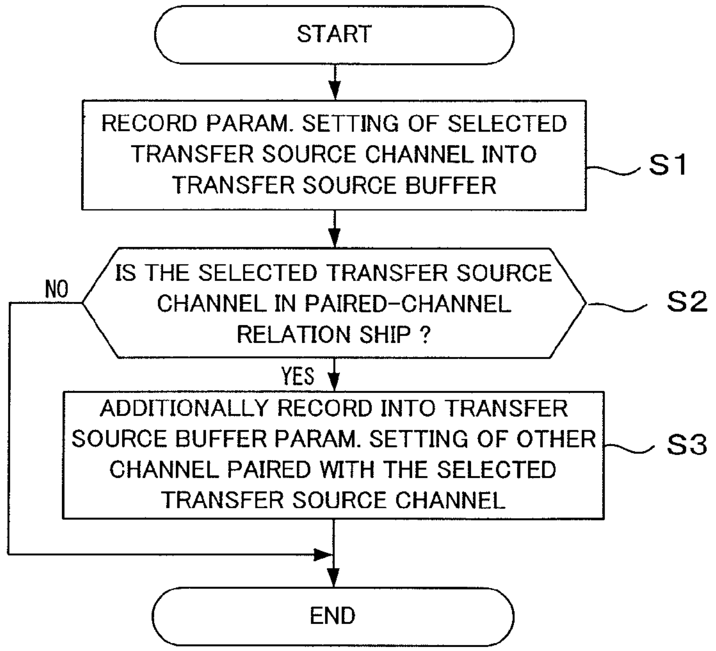
FIG. 3 is a flow chart explanatory of behavior of the channel parameter transfer function in the embodiment, which particularly shows an example operational sequence to be started in response to selection of a transfer source channel.
Figure 4:
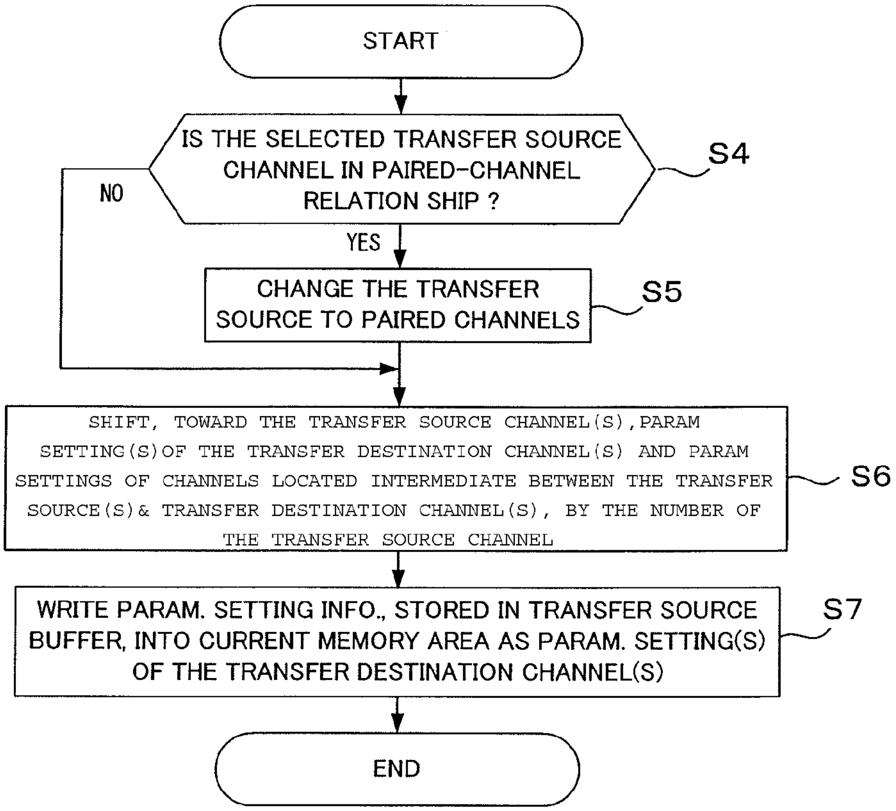
FIG. 4 is a flow chart explanatory of behavior of the channel parameter transfer function in the embodiment, which particularly shows an example operational sequence to be started in response to a channel parameter transfer instruction.

FIGS. 3 and 4 are flow charts explanatory of operational sequences of the channel parameter transfer function performed in the instant embodiment. This channel parameter transfer function may be carried out, for example, via a dedicated "channel parameter transfer screen" called out to the display section 9. On the "channel parameter transfer screen" called out to the display section 9, the user can use the GUI to select any desired channel as the parameter transfer source channel. Once such a transfer source channel is selected, the process flowcharted in FIG. 3 is started up. Let it be assumed here that only one channel can be selected by the user as the transfer source channel.

At step S1, the information indicative of a parameter setting of the transfer source channel ("ch" in the figure) is copied (or saved) to a transfer source buffer. As noted above, the current settings of all of the parameters of the mixer are stored in the current memory area of the RAM 3, and thus, it is only necessary that the information indicative of the current parameter setting of the transfer source channel be read out from the current memory area and stored into the transfer source buffer. Note that, before the information indicative of the parameter setting of the transfer source channel is recorded into the transfer source buffer, information last buffered in the transfer source buffer is cleared so as to allow only the information indicative of the parameter setting of the currently-selected (or designated) transfer source channel to be recorded in the transfer source buffer. Corresponding space in the current memory, storing the parameter setting of the transfer source channel saved to the transfer source buffer, has now become an available space (i.e., space where previous data may be overwritten with other data). As will be later described, the parameter settings of given channels can be sequentially shifted within the current memory area using the available space. Lastly, a space in the current memory area corresponding to a transfer source channel becomes an available space and the parameter setting of the transfer source channel, having so far been saved to the transfer source buffer, is written into the available space of the current memory area, so that, ultimately, the parameter of the transfer source channel is transferred to the transfer destination channel.

At step S2 of FIG. 3, a determination is made as to whether the selected transfer source channel is currently set in a paired-channel relationship with another channel. With a YES determination at step S2, information indicative of the parameter setting of the other channel paired with the selected transfer source channel is copied from the current memory area and additionally recorded into the transfer source buffer, at step S3. Because the parameter setting of the other channel paired with the selected transfer source channel is additionally recorded into the transfer source buffer without the information of the selected transfer source channel recorded at step S1 being cleared, the information of each of the paired transfer source channels is recorded into the transfer source buffer.

After that, the user designates any one of the plurality of channels as a transfer destination channel. The channel designated as the transfer destination channel has to be of the same type as the transfer source channel. Namely, if the transfer source is an input channel, the transfer destination too is selected from among the input channels. The transfer destination channel can be designated, for example, on the "channel parameter transfer screen", having been called out to the display section 9, using the GUI. Once the transfer destination channel is designated by the user, an operation is carried out for recording the channel number of the selected transfer destination channel into a transfer destination buffer in the RAM 3. Note that, before the channel number of the selected transfer destination channel is recorded into the transfer destination buffer, information last buffered in the transfer destination buffer is cleared so as to allow only the channel number of the currently-selected transfer destination channel to be recorded in the transfer destination buffer.

Instruction for executing the channel parameter transfer may be given, for example, by the user operating a "transfer execution switch" provided on the "channel parameter transfer screen" called out to the display section 9. Upon detection of such a channel parameter transfer execution instruction given by operation of the transfer execution switch or the like, the operational sequence flowcharted in FIG. 4 is started up. At step S4, a determination is made as to whether the selected transfer source channel is currently set in a paired-channel relationship with another channel. With a YES determination at step S4, the transfer destination is changed, at step S5, to paired channels on the basis of the channel number recorded in the transfer destination buffer. Because the channel pairing is carried out in accordance with a predetermined channel combination (i.e., combination of adjoining odd- and even-numbered channel numbers) as noted above, the channel number to be paired with the channel number recorded in the transfer destination buffer is automatically determined. If the channel selected as the transfer destination is currently set in a paired-channel relationship with another channel, then two channel numbers of the user-selected transfer destination channel and other channel to be paired with the user-selected transfer destination channel are recorded into the transfer destination buffer through the operation at step S5.

At following step S6, the channel parameter setting(s) of the transfer destination channel(s) and the channel parameter settings of the channels located intermediate between the transfer source channel(s) and the transfer destination channel(a) are read out from the current memory area, and these read-out parameter settings are written over previous data in the current memory area as channel parameter settings for channels of channel numbers shifted, by the number of the designated transfer source channel, toward the transfer source channel(s). This operation corresponds generally to the operation of shifting the channel parameter settings of channels ch2-ch4 in (a) of FIG. 2 to channels ch1-ch3 in (b) of FIG. 2. Namely, by the parameter setting of the transfer source channel ch1 having been saved to the transfer source buffer, the space in the current memory area, which corresponds to channel ch1, is currently an available space, and the parameter setting of channel ch2 is shifted to that available space. Consequently, the space in the current memory area, which corresponds to channel ch2, now becomes an available space, so that the parameter setting of channel ch3 is shifted to the available space. Consequently, the space in the current memory area, which corresponds to channel ch3, now becomes an available space, so that the parameter setting of channel ch4 is shifted to the available space. Lastly, the space in the current memory area, which corresponds to channel ch4, now becomes an available space, so that the parameter setting of the transfer source channel ch1, having so far been saved to the transfer source buffer, is written into the available space through an operation of next step S7. Namely, if only one transfer source channel has been selected without being paired with any other channel, the parameter settings of the transfer destination channel and channels located intermediate between the transfer source channel and the transfer destination are shifted by one channel toward the transfer source channel. If the selected transfer source channel is currently set in a paired-channel relationship with another channel, the parameter setting of each of the channels located intermediate between the paired transfer source channels and the paired transfer destination channels are shifted by two channels toward the transfer source channels. By the parameter setting(s) of the transfer destination channel(s) and the parameter setting(s) of all of the channels located intermediate between the transfer source channel(s) and the transfer destination channel(s) being shifted toward the transfer source channel(s) as set forth above, a channel parameter transfer destination can be secured.

At step S7, the parameter setting information currently stored in the transfer source buffer is written into the current memory area as the parameter setting(s) of the transfer source channel number(s), so that the channel parameter setting(s) of the channel(s) designated as the transfer source(s) can be inserted into the transfer destination channel(s). Particularly, if the selected or designated transfer source channel is currently set in a paired-channel relationship with another channel, the parameter setting information of the odd-numbered channel number in the transfer source buffer is written into the space of the current memory area corresponding to the odd-numbered channel number while the parameter setting information of the even-numbered channel number in the transfer source buffer is written into the space of the current memory area corresponding to the even-numbered channel number; thus, the parameter settings can be transferred without the interrelation of the channel pairs (i.e., order of the odd-numbered and even-numbered channels) being lost.

With the embodiment arranged in the above-described manner, a desired parameter setting of a given channel can be readily inserted into a location of another channel. If the transfer source channel is in a paired-channel relationship with another channel, desired parameter settings can be inserted without the paired state being lost.

Whereas several examples of channel parameters are mentioned above in relation to the embodiment as objects to be transferred by the transfer function, the objects to be transferred are not limited to the above-mentioned, and any other desired channel parameters may be transferred by the transfer function as long as they can be set in the transfer source channel.

Further, the channel parameter transfer function described above in relation to the embodiment may be performed on various channels, such as input channels, bus-out channels, AUX send channels, MATRIX send channels and output channels, as long as the channel parameter transfer is between channels of the same type.

Furthermore, the channel parameter transfer execution instruction has been described as given by operation of, for example, the "transfer execution switch" provided on the "channel parameter transfer screen" read out to the display section 9, the channel parameter transfer may be instructed in response to designation of transfer source and transfer destination channels.

Furthermore, whereas the channel parameter transfer function has been described above as manipulated and performed using the GUI on the screen read out to the display section 9, the channel parameter transfer function may be manipulated and performed using a physical operator provided on the operation panel for performing the channel parameter transfer function. Alternatively, the channel parameter transfer function may be manipulated and performed on a personal computer, externally connected to the mixer, through activation of a software program for performing the channel parameter transfer function.

Furthermore, whereas the embodiment has been described above as saving the parameter setting of the transfer source channel to the transfer source buffer, the present invention is not so limited, and the parameter setting of the transfer destination channel may be saved to the transfer destination buffer. In such a case, by the parameter setting of the transfer destination channel ch4 being saved to the transfer destination buffer in the illustrated example of FIG. 2, the parameter setting of channel ch1 is written into the space in the current memory area which corresponds to channel ch4 and which has now become an available space, then the parameter setting of channel ch2 is written into the space in the current memory area which corresponds to channel ch1 and which has now become an available space, then the parameter setting of channel ch3 is written into the space in the current memory area which corresponds to channel ch2 and which has now become an available space, and lastly the parameter setting of channel ch4 is written into the space in the current memory area which corresponds to channel ch3 and which has now become an available space. Alternatively, parameter settings of a plurality of channels may be collectively saved to a buffer memory and an available space for a plurality of channels may be created in the current memory area; in this case, the parameter settings of the plurality of channels may be written from the buffer memory into the current memory area in desired arrangement and desired order.

What is claimed is:

1. A mixer apparatus comprising:

a plurality of signal processing channels; an input device comprising:

a setting section that sets a signal processing parameter for each of the channels;

a channel designation section that designates a parameter transfer source channel and a parameter transfer destination channel; and a control section that, in accordance with designation by said channel designation section, performs control to transfer a parameter setting of at least one of the channels in said setting section to another one of the channels, said control section performing control to transfer the parameter setting of the designated transfer source channel to the designated transfer destination channel and sequentially shift, toward the transfer source channel, parameter setting of the designated transfer destination channel and parameter settings of all channels located intermediate between the designated transfer source channel and the designated transfer destination channel.

2. A mixer apparatus as claimed in claim 1 which further comprises:

a determination section that determines whether the transfer source channel designated by said designation section is currently set in a paired-channel relationship with any other channel; and a pair channel addition section that, when said determination section has determined that the transfer source channel designated by said designation section is currently set in the paired-channel relationship with any other channel, adds, as another transfer source channel, the other channel to be paired with the designated transfer source channel and also adds, as another transfer destination channel, any other channel to be paired with the designated transfer destination channel, and wherein, in accordance with the designation by said channel designation section and addition by said pair channel addition section, performs control to transfer the parameter settings of the paired transfer source channels to the paired transfer destination channels and sequentially shift, toward the transfer source channels, the parameter settings of all channels located intermediate between the paired transfer source channels and the paired transfer destination channels and parameter settings of the paired transfer destination channels.

3. A mixer apparatus as claimed in claim 1 wherein said setting section includes a current memory that stores a set parameter for each of the channels, said control section includes a buffer memory to be used for saving a parameter setting of at least one of the channels, said control section saves the parameter setting of the transfer source or transfer destination channel, stored in said current memory, into said buffer memory to thereby create an available space in said current memory, then uses the available space to sequentially shift, within said current memory, the parameter setting of each of the channels to be transferred, and lastly writes, into the available space in said current memory, the parameter setting of the transfer source or transfer destination channel having so far been saved in said buffer memory.

4. A mixer apparatus as claimed in claim 1 wherein said signal processing parameter for each of the channels includes at least one of a fader level parameter, a parameter for a compressor function and a parameter for an equalizer function.

5. A mixer apparatus as claimed in claim 1 wherein successive unique channel numbers are allotted to individual ones of said plurality of signal processing channels, and wherein said all channels located intermediate between the designated transfer source channel and the designated transfer destination channel are channels having allotted thereto respective ones of all successive channel numbers intermediate between a channel number of said designated transfer source channel and a channel number of said designated transfer destination channel.

6. A mixer apparatus as claimed in claim 2 wherein successive unique channel numbers are allotted to individual ones of said plurality of signal processing channels, and wherein said all channels located intermediate between the designated transfer source channel and the designated transfer destination channel are channels having allotted thereto respective ones of all successive channel numbers located intermediate between a channel number of said designated transfer source channel and a channel number of said designated transfer destination channel.

7. A mixer apparatus as claimed in claim 6 wherein said other channel to be paired with the designated transfer source channel or the designated transfer destination channel is a channel having allotted thereto a channel number adjoining a channel number of the designated transfer source channel or the designated transfer destination channel is allotted.

8. A method for changing a parameter setting of a signal processing channel in a mixer apparatus which includes a plurality of the signal processing channels and a setting section that sets a signal processing parameter for each of the channels, said method comprising:

a step of designating a parameter transfer source channel and a parameter transfer destination channel; and a control step of, in accordance with designation by said step of designating, performing control to transfer a parameter setting of at least one of the channels in the setting section to another one of the channels, said control step performing control to transfer a parameter setting of the designated transfer source channel to the designated transfer destination channel and sequentially shift, toward the transfer source channel, parameter setting of the designated transfer destination channel and parameter settings of all channels located intermediate between the designated transfer source channel and the designated transfer destination channel.

9. A non-transitory computer readable storage medium containing a group of instructions for causing a computer to perform a procedure for changing a parameter setting of a signal processing channel in a mixer apparatus which includes a plurality of the signal processing channels and a setting section that sets a signal processing parameter for each of the channels, said procedure comprising:

a step of designating a parameter transfer source channel and a parameter transfer destination channel; and a control step of, in accordance with designation by said step of designating, performing control to transfer a parameter setting of at least one of the channels in the setting section to another one of the channels, said control step performing control to transfer a parameter setting of the designated transfer source channel to the designated transfer destination channel and sequentially shift, toward the transfer source channel, parameter setting of the designated transfer destination channel and parameter settings of all channels located intermediate between the designated transfer source channel and the designated transfer destination channel.

* * * * *